(12) United States Patent
Reinke et al.

(10) Patent No.: US 10,145,556 B1
(45) Date of Patent: Dec. 4, 2018

(54) METHOD OF VAPORIZING A FLUID

(71) Applicant: Modine Manufacturing Company, Racine, WI (US)

(72) Inventors: Michael Reinke, Franklin, WI (US); Gregory Mross, Sturtevant, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 84 days.

(21) Appl. No.: 15/226,983

(22) Filed: Aug. 3, 2016

Related U.S. Application Data

(63) Continuation of application No. 14/110,494, filed as application No. PCT/US2012/033736 on Apr. 16, 2012, now Pat. No. 9,417,012.

(60) Provisional application No. 61/476,829, filed on Apr. 19, 2011.

(51) Int. Cl.
*F28D 9/00* (2006.01)
*F22B 1/02* (2006.01)

(52) U.S. Cl.
CPC .................................. *F22B 1/021* (2013.01)

(58) Field of Classification Search
CPC ... F28D 1/00; F28D 9/00; F01K 13/00; F25B 39/028; F25B 41/06; F28F 9/028
See application file for complete search history.

(56) References Cited

U.S. PATENT DOCUMENTS

| | | | | |
|---|---|---|---|---|
| 7,044,205 B2 * | 5/2006 | Higashiyama | ........ | F28D 1/0341 165/148 |
| 2006/0070390 A1 * | 4/2006 | Reinders | ............... | F24F 5/0035 62/310 |
| 2007/0261815 A1 * | 11/2007 | Melby | ................. | F02B 29/0462 165/41 |
| 2007/0267000 A1 * | 11/2007 | Raduenz | ............... | F28D 9/0056 123/568.12 |
| 2008/0006398 A1 * | 1/2008 | Schatz | .................. | F28D 7/1684 165/177 |
| 2008/0032587 A1 * | 2/2008 | Krivanek | ................ | G09F 19/08 446/149 |
| 2008/0115922 A1 * | 5/2008 | Horek | ....................... | F28D 9/00 165/240 |
| 2009/0272515 A1 * | 11/2009 | Wu | ..................... | F02B 29/0462 165/140 |
| 2010/0084120 A1 * | 4/2010 | Yin | ........................ | F22B 27/00 165/146 |
| 2010/0282452 A1 * | 11/2010 | Diem | .................... | F01K 23/065 165/167 |
| 2013/0186089 A1 * | 7/2013 | Bruckner | .................. | F01K 7/22 60/641.11 |

* cited by examiner

*Primary Examiner* — Mark Laurenzi
*Assistant Examiner* — Shafiq Mian
(74) *Attorney, Agent, or Firm* — Michael Best & Friedrich LLP; Jeroen Valensa; Michael Bergnach

(57) ABSTRACT

A method is provided to vaporize a working fluid using a heat sourcing fluid. A first portion of the heat sourcing fluid passes through the first section, in counter-flow with the working fluid. A second portion of the heat sourcing fluid passes through the second section, in co-flow with the working fluid. Both the first and second portions pass through the third section, in overall counter-flow with the working fluid. The working fluid passes sequentially through the third section, the first section, and the second section. The method may be used in a Rankine cycle for waste heat recovery or in a refrigerant cycle.

16 Claims, 11 Drawing Sheets

METHOD OF VAPORIZING A FLUID

CROSS REFERENCE TO RELATED APPLICATIONS

This application is a Continuation of U.S. patent application Ser. No. 14/110,494, filed Oct. 8, 2013, which is a National Stage Entry of International Patent Application No. US2012/033736, filed Apr. 16, 2012, which claims priority to U.S. Provisional Patent Application No. 61/476,829, filed Apr. 19, 2011, the entire contents of all of which are hereby incorporated by reference herein.

BACKGROUND

The present invention relates to heat exchangers.

Increasing the operating efficiency of heat engines and other power producing cycles has become more desirable as the cost of fuels has steadily increased. Additionally, the desire by both individuals and governmental bodies to reduce pollutants and other undesirable byproducts of fuel consumption has led to further interest in such increases. One recognized means by which such increases may be realized is waste heat recovery.

In a typical waste heat recovery system, thermal energy produced as a byproduct of a fuel-consuming process that would otherwise be wasted (e.g. discharged to the ambient as a waste stream) is captured and converted to useful work. One well-known thermodynamic cycle used for waste heat recovery is the Rankine cycle, wherein a working fluid is pressurized as a liquid, vaporized by receiving the waste heat, non-adiabatically expanded to recover mechanical work, and condensed and cooled to complete the cycle.

While it may be highly desirable to maximize the conversion efficiency of such a waste heat recovery cycle, certain other considerations necessarily must be taken into account. Many of the working fluids that perform favorably in Rankine cycle waste heat recovery systems are sensitive to breakdown of the fluid at elevated temperatures, necessitating regulation of the peak temperature to which such a fluid is heated. In addition, certain additives to the fluid such as, for example, lubricants for the expander, may have an upper temperature rating.

As a further complication, it may be necessary in some systems to control or regulate the temperature to which the waste stream is cooled. As one example, catalytic aftertreatment of the waste stream may necessitate that the stream is within a certain temperature range, in order that the activity of the catalyst may be suitable for the desired reactions.

Another example of the need to regulate the temperature of the waste stream can be found in exhaust gas recirculation (EGR) systems for internal combustion engines. In such a system, a high temperature exhaust gas stream is recycled from the exhaust manifold of an internal combustion engine back to the intake manifold of the engine. An EGR system may be used on a diesel or gasoline fueled compression ignition or spark ignition engine of a vehicle such as an automobile or truck, in order to reduce undesirable NOx emissions from the engine. In order to be successful at reducing those emissions, however, the recycled exhaust gas stream must be cooled to a much lower temperature than that at which it exits the exhaust manifold of the engine. Accordingly, waste heat must be rejected from the exhaust, and recovery of that waste heat through a Rankine cycle may advantageously be used to improve the efficiency of the vehicle.

The need to regulate the temperature of the vaporized working fluid and the need to regulate the temperature of the waste heat stream may oftentimes be at odds with one another, difficulties in the designing heat exchangers for such a system.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
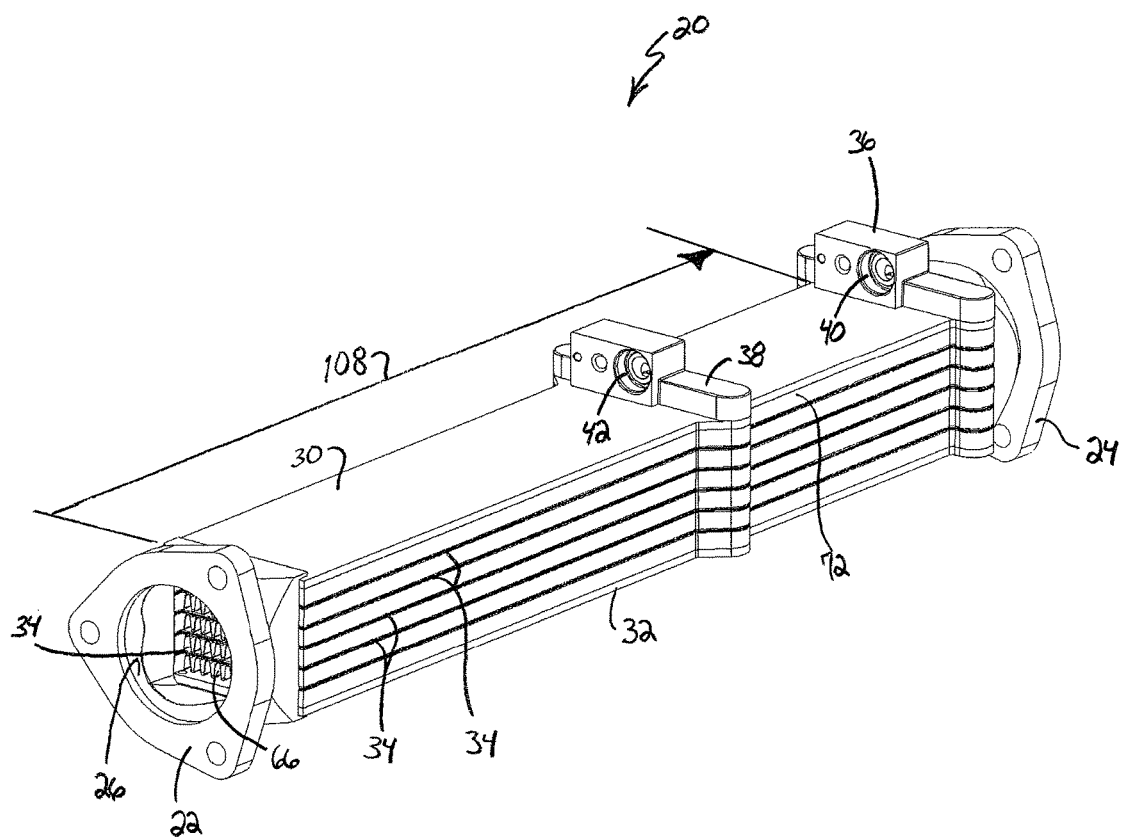
FIG. 1 is a perspective view of a heat exchanger specifically adapted to practice a first embodiment of the invention.

FIG. 1 illustrates a heat exchanger 20, which is an exhaust gas recirculation (EGR) cooler in one embodiment. The illustrated heat exchanger 20 includes a first connector 22 and a second connector 24. The first connector 22 defines a gas inlet 26 of the heat exchanger 20 and the second connector 24 defines a gas outlet 28 (FIG. 2) of the heat exchanger 20. A top plate 30 extends between the first connector 22 and the second connector 24, and a bottom plate 32 extends between the first connector 22 and the second connector 24 opposite the top plate 30. A plurality of plate assemblies 34 are located between the top plate 30 and the bottom plate 32.

An inlet manifold 36 and an outlet manifold 38 are coupled to and extend from the top plate 30. The inlet manifold 36 defines a working fluid inlet 40 of the heat exchanger 20 and the outlet manifold 38 defines a working fluid outlet 42 of the heat exchanger 20. The inlet manifold 36 provides fluid communication of a working fluid to each of the plurality of plate assemblies 34 and the outlet manifold 38 provides fluid communication from each of the plurality of plate assemblies 34.

Figure 2:
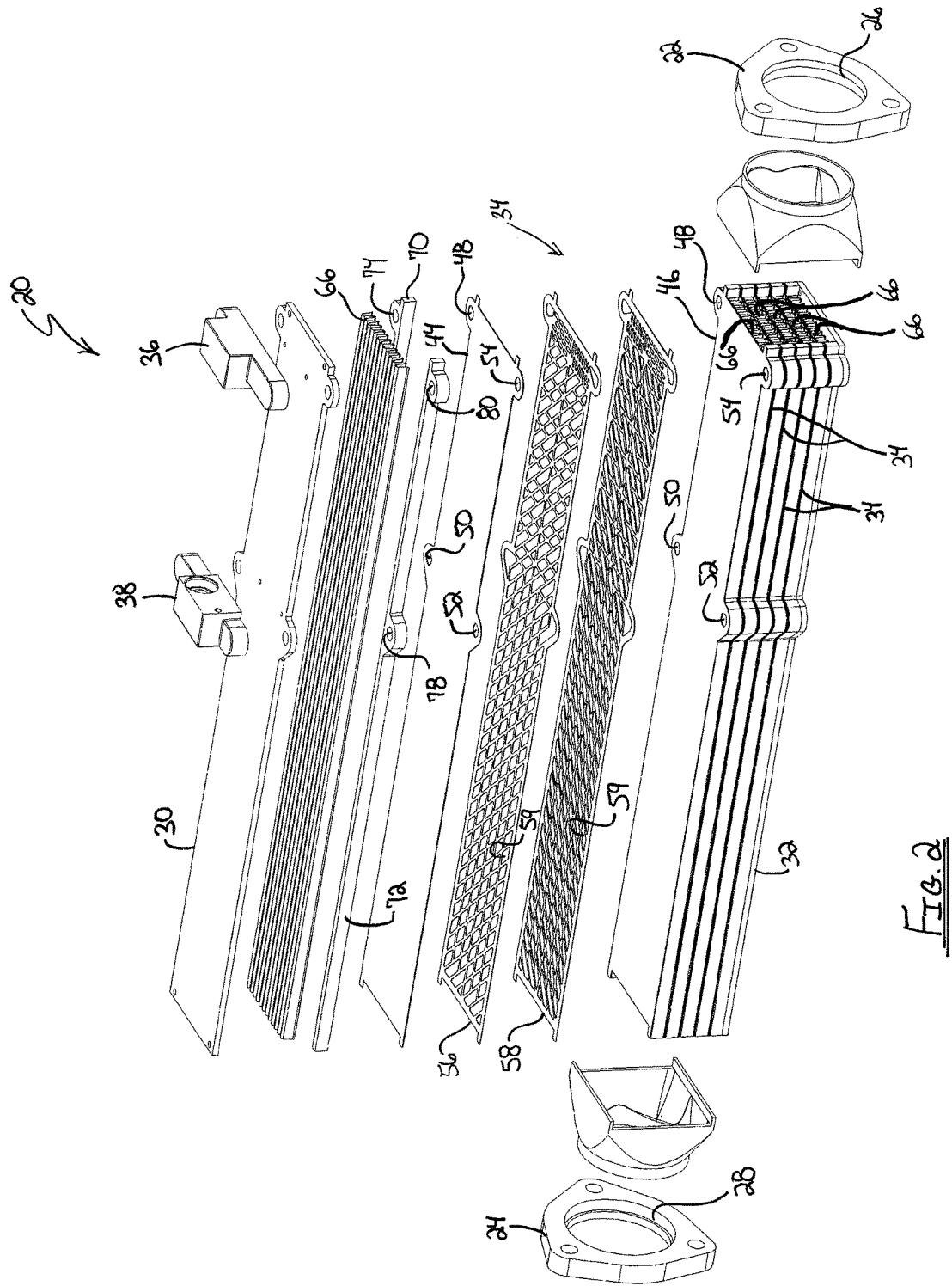
FIG. 2 is an exploded view of the heat exchanger of FIG. 1.
Figure 3:
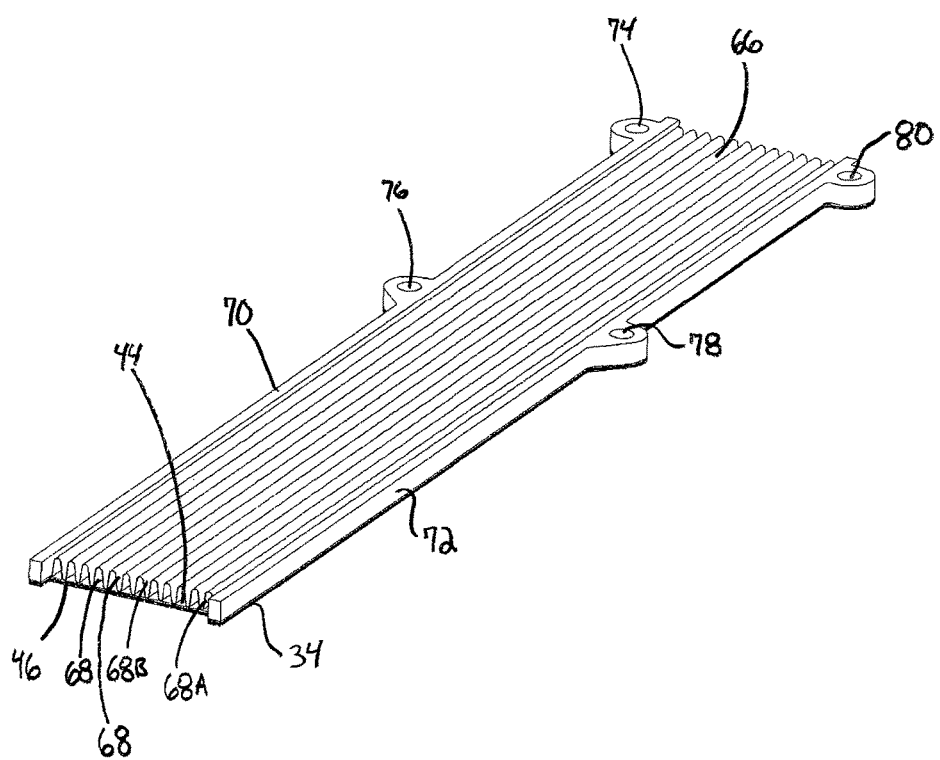
FIG. 3 is a perspective view of a portion of the heat exchanger of FIG. 1.
Figure 4:
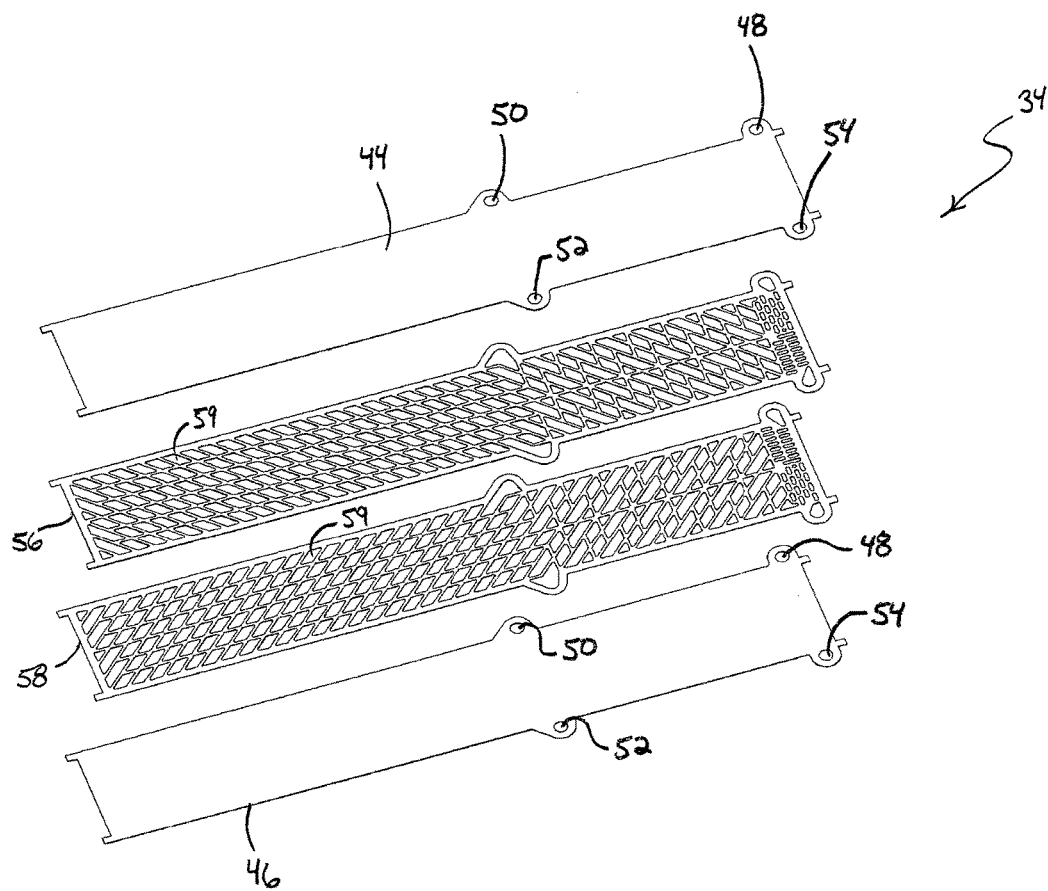
FIG. 4 is an exploded view of a plate assembly of the heat exchanger illustrated in FIG. 1.
Figure 5:
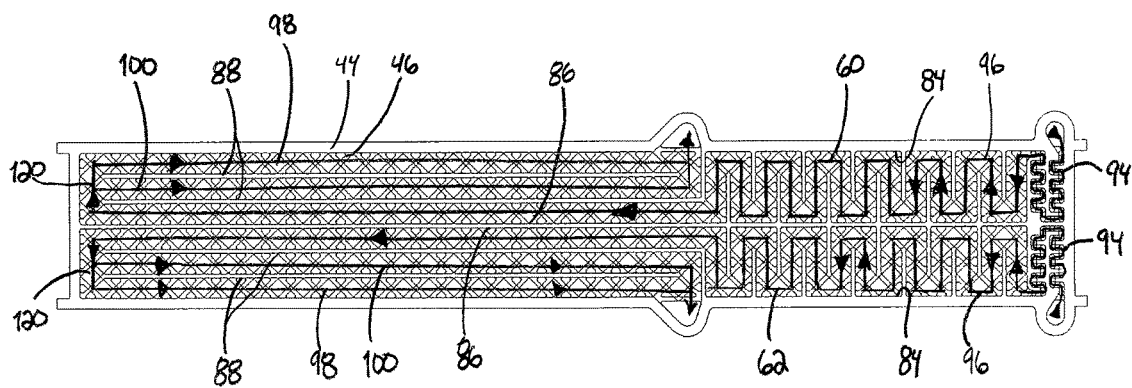
FIG. 5 is a top view of a pair of inserts of the plate assembly of FIG. 4.

Each of the plate assemblies 34 are substantially the same, and in some embodiments, generally identical. Therefore, only one of the plate assemblies 34 will be described in detail below. Referring to FIGS. 2-4, the plate assembly 34 includes a first plate 44 and a second plate 46. The first and second plates 44 and 46 each include apertures 48, 50, 52, and 54 located at the outer periphery of the plates 44 and 46. A first insert 56 and a second insert 58 are located between the plates 44 and 46. The first and second inserts 56 and 58 each include a plurality of cut-outs 59 such that when the plates are directly coupled together (FIG. 5) the cut-outs 59 of the inserts 56 and 58 partially overlap and define a first working fluid flow path 60 and a second working fluid flow path 62 between the plates 44 and 46. The first and second working fluid flow paths 60 and 62 are schematically illustrated in FIG. 5. In the illustrated embodiment, the inserts 56 and 58 are identical components with the same configuration of cut-outs 59 and the inserts 56 and 58 are flipped relative to each other, as best seen in FIG. 4, to define the first and second flow paths 60 and 62 illustrated in FIG. 5. Also, although in the illustrated embodiment the inserts 56 and 58 define two working fluid flow paths 60 and 62, in other embodiments, the inserts may define only a single working fluid flow path or more than two working fluid flow paths. Additional details of the illustrated working fluid flow paths 60 and 62 will be discussed in more detail below.

As best seen in FIGS. 1-3, a fin 66 is located between adjacent plate assemblies 34, as well as between the outermost ones of the plate assemblies 34 and the top and bottom plates 30, 32. Each of the fins 66 is generally an identical component, and therefore, only one of the fins 66 (FIG. 3) will be described in detail below. The illustrated fin 66 is corrugated and defines a plurality of conduits 68. The conduits 68 are defined by the corrugations and adjacent plates (e.g. 44, 46, 30, 32) and the conduits 68 generally extend from the gas inlet 26 to the gas outlet 28 in a direction parallel to and along a longitudinal axis of the heat exchanger 20.

With continued reference to FIGS. 1-3, a first rail 70 and a second rail 72 extend along the fin 66 and on top of the plate assembly 34. The rails 70 and 72 separate the plate assemblies 34 to provide an area for the fin 66. The rails 70, 72 are generally identical components in the illustrated construction, and the rail 70 includes apertures 74 and 76 and the rail 72 includes the apertures 78 and 80. The apertures 74, 76, 78, 80 provide fluid communication between respective apertures 48, 50, 52, 54 of the plate assemblies 34.

Figure 6:
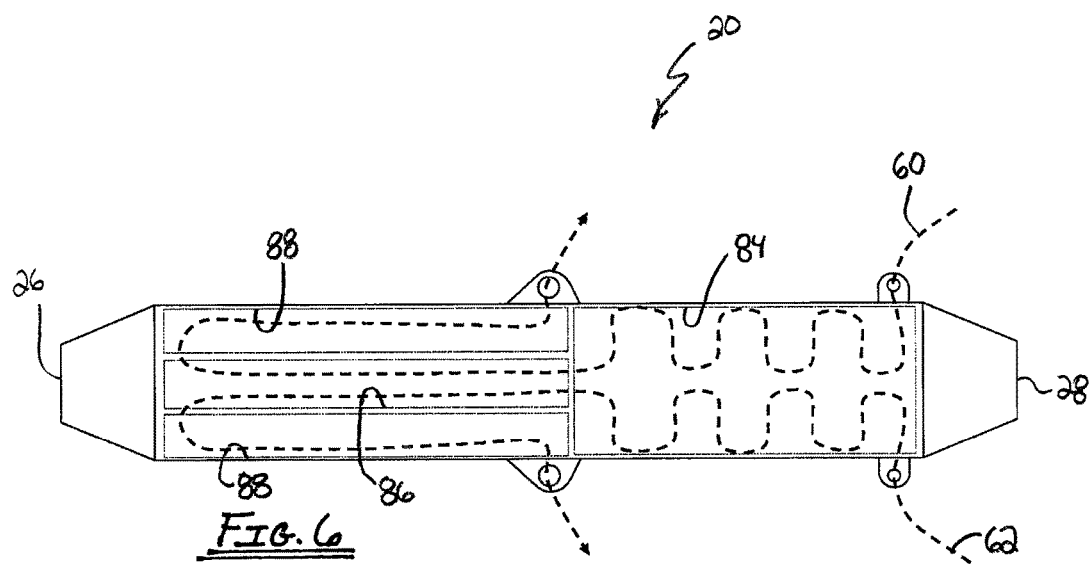
FIG. 6 is a schematic flow diagram of a working fluid flow through the heat exchanger of FIG. 1.

Referring to FIGS. 5-6, the working fluid flow paths 60, 62 each pass through a first heat exchange section 84, a second heat exchange section 86, and a third heat exchange section 88. Generally, the flow of the working fluid through the first heat exchange section 84 is in a cross-counter flow arrangement with respect to the exhaust gas flow passing through that same section. The exhaust gas flow is generally represented by arrows 92 of FIG. 7. As best seen in FIG. 5, the first heat exchange section 84 includes a first cross-counter flow path section 94 of the working fluid flow and a second cross-counter flow path section 96 of the working fluid flow. The first cross-counter flow path section 94 defines a more tortuous flow path, including alternating counter and co-flow arrangements, than the second cross-counter flow path section 96. The first cross-counter flow path section 94 is upstream, with respect to the fluid flow direction, from the second cross-counter flow path section 96. Also, the first counter-cross flow path section 94, having the more tortuous flow path is located adjacent the working fluid inlet 40.

Figure 7:
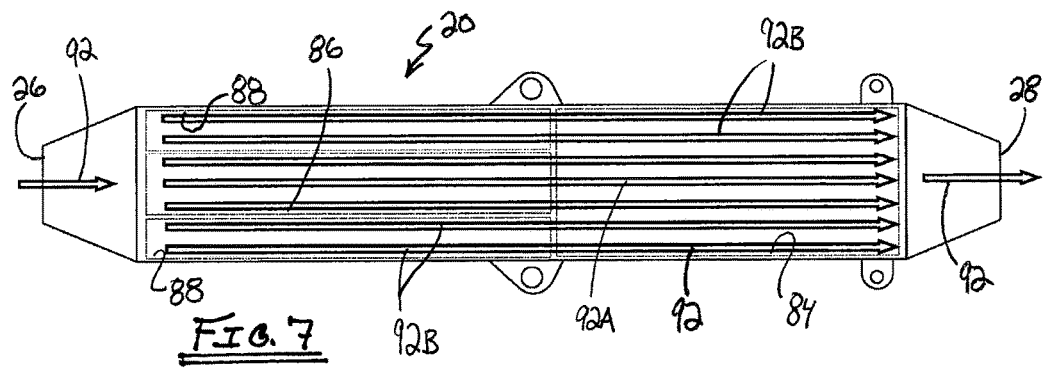
FIG. 7 is a schematic flow diagram of a heat sourcing fluid flow through the heat exchanger of FIG. 1.

The second heat exchange section 86 is immediately downstream from the first heat exchange section 84 relative to the working fluid flow direction, which is represented by the arrows in the flow paths 60 and 62. The working fluid in the second heat exchange section 86 is in a parallel counter flow arrangement with the exhaust gas flow 92 through that same section. As shown in FIG. 7, only a portion 92A of the exhaust flow 92 passes through the second heat exchange section 86. The third heat exchange section 88 is immediately downstream (relative to the working fluid flow) from the second heat exchange section 86. The working fluid in the third heat exchange section 88 is in a parallel co-flow arrangement with the exhaust gas flow 92 through that same section. As shown in FIG. 7, only a portion 92B of the exhaust flow 92 passes through the third heat exchange section 88. The portion 92B bypasses the second heat exchange section 86 and, similarly, the portion 92A bypasses the third heat exchange section 88. In the illustrated embodiment, the third heat exchange section 88 includes a first flow path 98 of the working fluid and a second flow path 100 of the working fluid. The first and second flow paths 98 and 100 are arranged in parallel and provide separate flow paths from the second heat exchange section 86 through the third heat exchange section 88.

Figure 12:
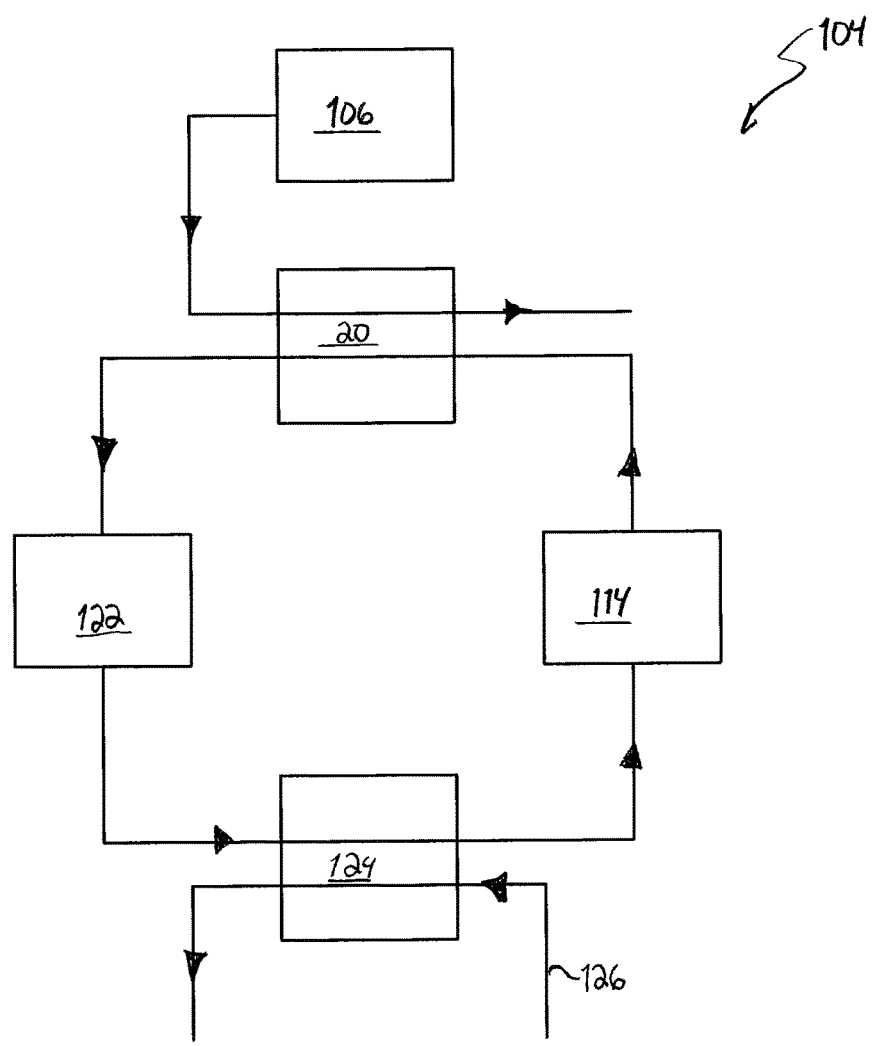
FIG. 12 is a schematic illustration of a Rankine cycle system according to another embodiment of the invention.
Figure 13:
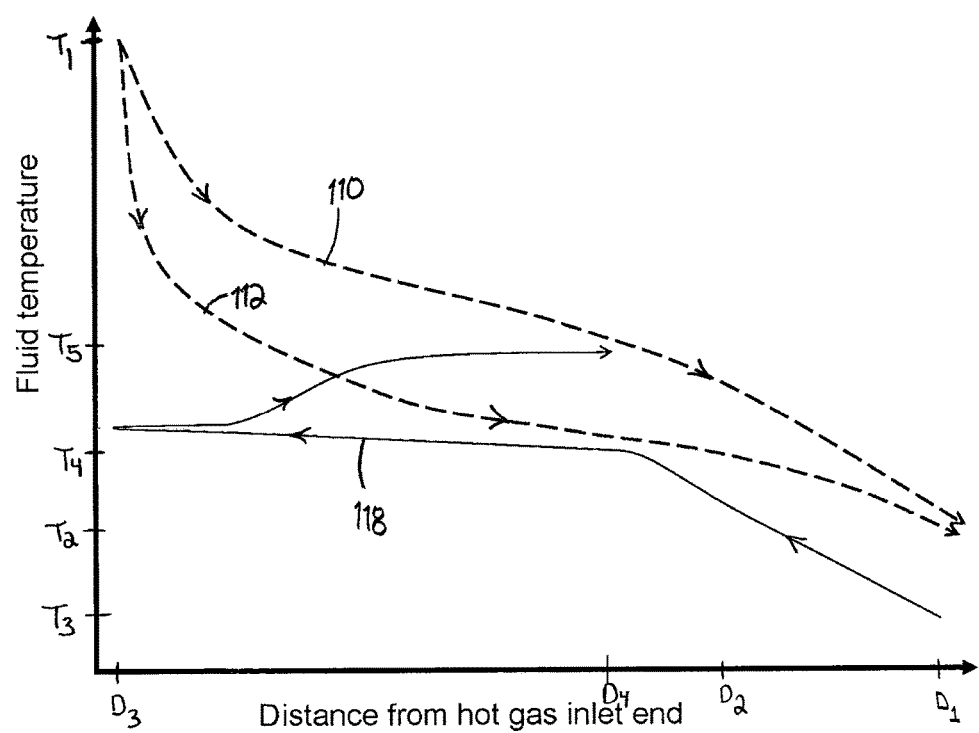
FIG. 13 is a graphical representation of operation of the heat exchanger of FIG. 1.

In operation, referring to FIGS. 1 and 12, the heat exchanger 20 can be used in a Rankine cycle 104 schematically illustrated in FIG. 12 to evaporate a working fluid using a heat sourcing fluid. FIG. 13 graphically illustrates the temperature of the gas and the working fluid versus a variable distance 108 (FIG. 1) from the gas inlet 26, and the graph of FIG. 13 will be discussed in more detail below. The distance 108 is measured parallel to and along the longitudinal axis of the heat exchanger 20 and parallel to and along the gas flow conduits 68.

The heat exchanger 20 receives a hot exhaust gas flow from a heat sourcing fluid source 106 (FIG. 12), such as an exhaust gas manifold of an internal combustion engine. The exhaust gas flow enters the heat exchanger 20 through the inlet 26 at an inlet temperature T1 (FIG. 13). Then, exhaust gas flow is separated into a plurality of parallel flow portions each defined by one or more of the gas flow conduits 68. The dashed line 110 of FIG. 13 represents the temperature of a first exhaust flow portion 92B (FIG. 7), including the flow passing through the conduit labeled 68A in FIG. 3, and the dashed line 112 of FIG. 13 represents the temperature of a second exhaust flow portion 92A (FIG. 7) including the flow passing through the conduit 68B in FIG. 3. The exhaust gas travels through the conduits 68 and is recombined adjacent the gas outlet 28 (FIG. 7) before exiting the heat exchanger 20 at the temperature T2 (FIG. 13). It should be observed that, while all of the conduits 68 extend through the first heat exchange section 84, the conduit 68A extends through the third heat exchange section 88 but not the second heat exchange section 86, and the conduit 68B extends through the second heat exchange section 86 but not the third heat exchange section 88.

Referring to FIG. 12, a working fluid pump 114 of the Rankine cycle 104 pumps the working fluid to the heat exchanger 20. A flow of working fluid is received in the heat exchanger 20 by the inlet 40 and divided by the inlet manifold 36. About half of the working fluid flow is divided and directed to flow through apertures 74 and 48 (FIGS. 3 and 4) to be distributed to the plate assemblies 34 to create the first flow path 60 and about half of the working fluid flow is divided and directed to flow through apertures 80 and 54 (FIGS. 3 and 4) to create the second flow path 62. Both flow paths 60 and 62 are substantially the same, and therefore, only the flow path 62 for one of the plate assemblies 34 will be discussed in detail below.

Referring to FIG. 13, the working fluid enters the plate assembly 34 at a distance D1 from the gas inlet 26 and at a temperature T3. After entering the plate assembly 34, the working fluid flows through the first cross-counter flow path section 94 (FIG. 5) having the tortuous flow path and defining a working fluid distribution region. The tortuous flow path creates a relatively large pressure drop of the working fluid to inhibit instability of the working flow downstream when it becomes a two-phase mixture of fluid and gas. The working fluid then flows to the second cross-counter flow path section 96. When the working fluid flows through the first heat exchange section 84 containing the flow path section 96, generally in cross-counter flow with respect to the exhaust gas flow, heat is transferred from both the exhaust gas portions 92A and 92B (FIG. 7) to the working fluid in the working fluid flow paths 60, 62. Therefore, the temperature of the working fluid flow, represented by line 118 of FIG. 13, increases from the temperature T3 as the working fluid travels through the first heat exchange section 84, which ends at about the distance D2. In the exemplary operating condition shown in FIG. 13 the working fluid remains a single phase liquid throughout the first heat exchange section 84.

After the first heat exchange section 84, the working fluid flows in to the second heat exchange section 86, wherein the working fluid is in a parallel counter flow arrangement with the exhaust gas flow. In the second heat exchange section 84, heat is transferred from the exhaust gas flow portion 92A (the temperature of which is indicated by line 112 of FIG. 13), but generally not from the exhaust gas flow portion 92B (the temperature of which is indicated by line 110 of FIG. 13). Heat is transferred in the second heat exchange section 84 to increase the temperature of the working fluid to a saturation temperature T4 where the working fluid transitions to a two phase mixture of liquid and gas. As the two phase working fluid continues through the second heat exchange section 86, additional heat is transferred from the exhaust gas flow portion 92A to the working fluid as latent heat, increasing the vapor quality of the working fluid. The working fluid continues along the second heat exchange section 86 until a cross-flow turn 120 at distance D3 where the working fluid enters the third heat exchange section 88. The working fluid in the third heat exchange section is in a parallel co-flow arrangement with the exhaust gas flow. In the third heat exchange section 88, heat is transferred from the exhaust gas flow portion 92B, but generally not from the exhaust gas flow portion 92A. Heat is transferred in the third heat exchange section 88 to fully vaporize the working fluid, and to superheat the working fluid to a superheated temperature T5 over the length of the working fluid flow path in the third heat exchange section 88, terminating at about distance D4.

The superheated working fluid from the flow paths 60, 62 exits the plate assembly 34 through the apertures 52 and 78 (FIGS. 3 and 4) and then exits the heat exchanger 20 through the outlet 42 (FIG. 1). Referring to FIG. 12, the superheated working fluid is directed to an expander 122, such as a turbine, of the Rankine cycle 104 to convert the energy contained in the working fluid. After exiting the expander 122, the working fluid travels to a condenser 124 where it is cooled by a cooling source 126 and the working fluid is directed back to the pump 114 as a single phase liquid.

Certain advantages can be achieved in operating the Rankine cycle 104 in the above described manner. By providing only the portion 92A of the exhaust gas flow 92 to the second heat transfer section 86, the available heat that can be transferred from the exhaust gas to the working fluid in the second heat transfer section 86 is limited. As can be seen by the temperature line 112 in FIG. 13, the exhaust gas temperature is reduced down to approximately the working fluid saturation temperature T4 in the second heat exchange section 86, which represents close to the maximum amount of heat that can be transferred between the two fluids in that heat exchange section. Due to the reduced mass flow of exhaust gas, heat so transferred is insufficient to fully vaporize working fluid flow, as evidenced by the two-phase region persisting into the third heat exchange section 88. By having the working fluid in a two-phase condition at the location D3, where the exhaust gas temperature is at its highest level (T1), thermal breakdown of the working fluid can be avoided.

The superheat temperature T5 is similarly controlled to an acceptable level. By virtue of the reduced mass flow in the exhaust gas flow portion 92B passing through the third heat exchange section 88, the amount of heat that can be transferred to the working fluid within the third heat exchange section 88 is also limited. The co-flow orientation of the fluids within that section leads to a thermal pinch occurring at the temperature T5, and further heating of the working fluid above the temperature T5 can be prevented. Additional heat is still recovered from both exhaust gas portions 92A and 92B in the first heat exchange section 84 of the heat exchanger 20, so that the overall recovery of heat from the exhaust gas flow can be maximized. In addition, cooling down the temperature of the exhaust gas to the low temperature T2 can provide advantages in reducing undesirable engine emissions (e.g. NOx) when the exhaust gas flow passing through the heat exchanger 20 is recirculated back to the engine as an EGR flow.

Figure 8:
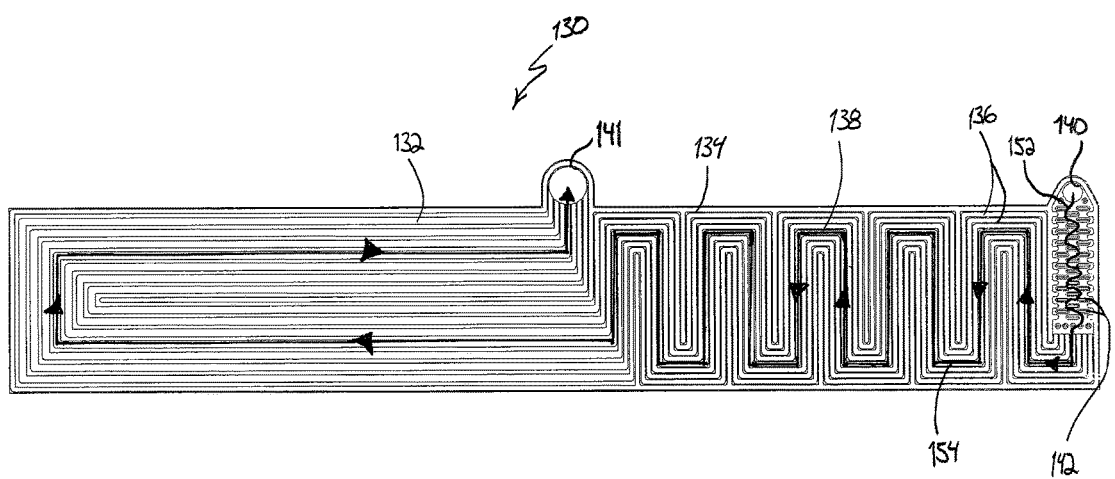
FIG. 8 is a top view of a plate for use in a heat exchanger specifically adapted to practice a second embodiment of the invention.

FIG. 8 illustrates a formed plate 130 for use in a heat exchanger 131 (FIG. 10), which is similar to the heat exchanger 20 of FIG. 1. The formed plate 130 is used generally in lieu of the inserts 56 and 58 of the heat exchanger 20 (FIG. 4). The formed plate 130 has similar characteristics to the combined inserts 56 and 58, described above. Therefore, only differences between the heat exchanger 20 using the combined inserts 56 and 58 and the heat exchanger 131 using the formed plate 130 will be described in detail below.

Figure 9:
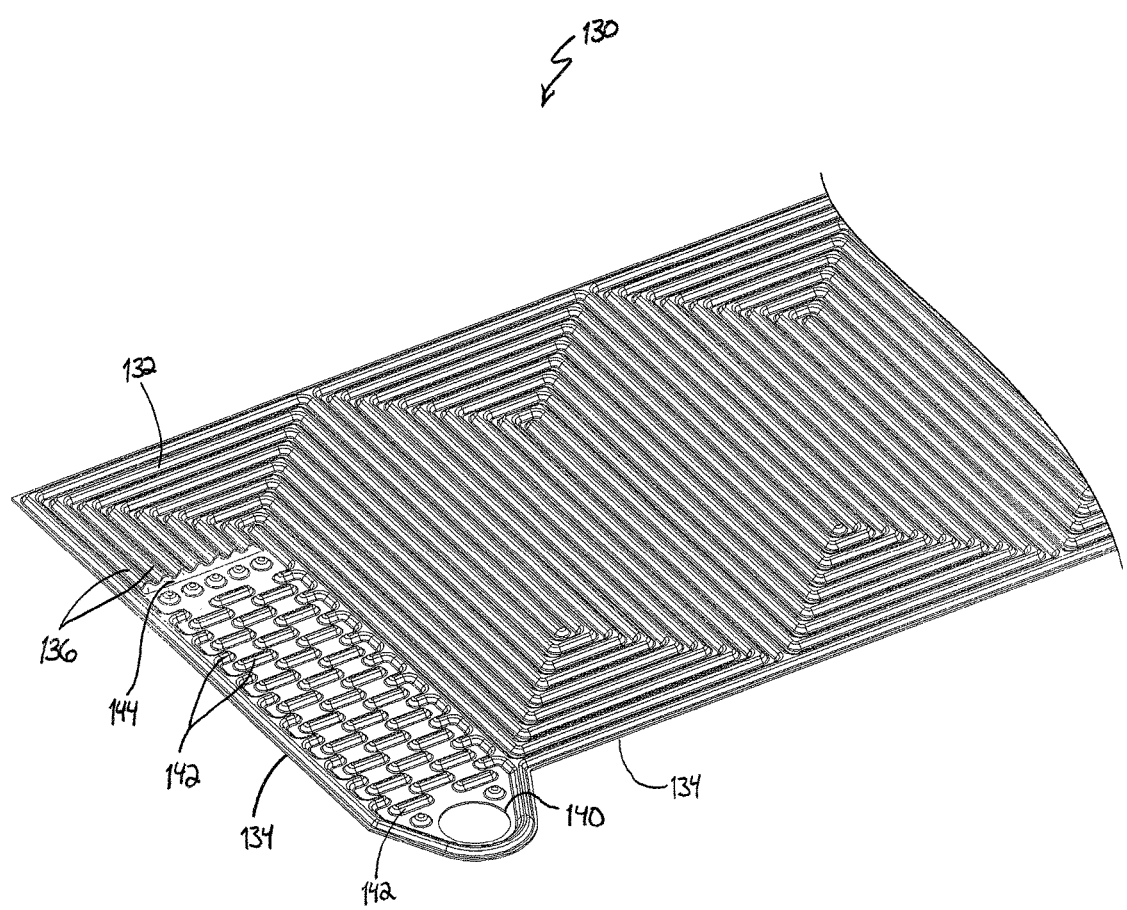
FIG. 9 is a perspective view of a portion of the plate of FIG. 8.

Referring to FIGS. 8 and 9, the formed plate 130 includes a first side 132 and a second side 134, and when assembled with the heat exchanger 131, the formed plate 130 is placed between plates similar to the plates 44 and 46 of the heat exchanger 20 (FIG. 2). Corrugations 136 are formed in the plate 130, and the corrugations 136 are arranged to define a working fluid flow path 138 on the first side 132 and the second side 134 of the plate 130. The plate 130 further includes an inlet aperture 140, an outlet aperture 141, and a plurality of discreet projections 142 adjacent the inlet aperture 140. A slot 144 extends through the plate 130 between the projections 142 and the corrugations 136. In one embodiment, the plate 130 is formed by stamping.

Figure 10:
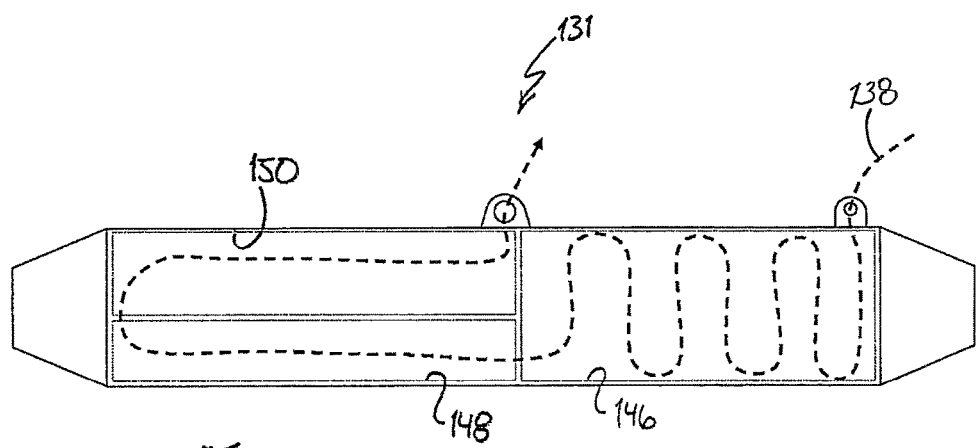
FIG. 10 is a schematic flow diagram of a working fluid flow through a heat exchanger including the plate assembly of FIG. 8, according to the second embodiment of the invention.
Figure 11:
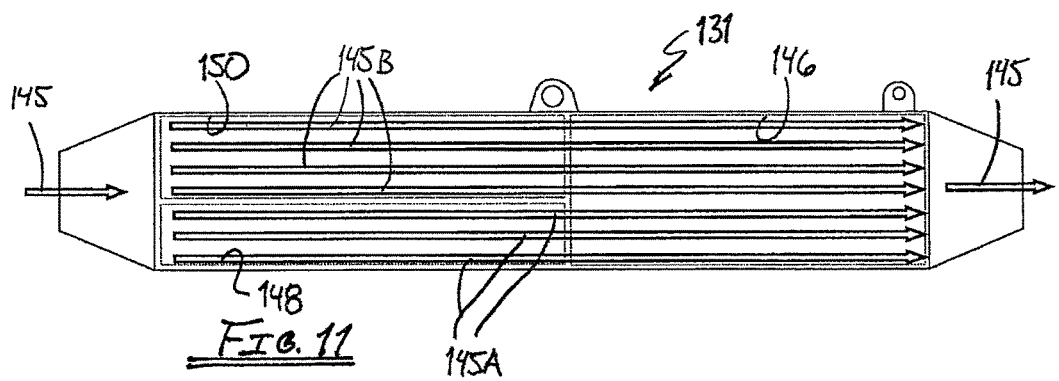
FIG. 11 is a schematic flow diagram of a heat sourcing fluid flow through a heat exchanger including the plate assembly of FIG. 8, according to the second embodiment of the invention.

Referring to FIGS. 8 and 10, the working fluid flow path 138 is similar to the working fluid flow paths 60 and 62 described above. The working fluid flow path 138 passes through a first heat exchange section 146, a second heat exchange section 148, and a third heat exchanger section 150. Generally, the flow of the working fluid through the first heat exchange section 146 is in a cross-counter flow arrangement with respect to the exhaust gas flow passing through the first heat exchange section 146. The exhaust gas flow is generally represented by arrows 145 of FIG. 11. The first heat exchange section 146 includes a first cross-counter flow path section 152 of the working fluid flow 138 and a second cross-counter flow path section 154 of the working fluid flow 138. The first cross-counter flow path section 152 includes the projections 142 and defines a more tortuous flow path, including alternating counter and co-flow arrangements, than the second cross-counter flow path section 154. The first cross-counter flow path section 152 is upstream, with respect to the fluid flow direction, from the second-cross counter flow path section 154. In operation, the working fluid passes through the inlet aperture 140, travels between the projections 142, and then a portion of the working fluid passes through the slot 144. The portion of the working fluid that passes through the slot 144 travels through the working fluid flow path 138 on the second side 134 of the plate while the remainder travels through the working fluid flow path 138 on the first side 132 of the plate 130 until the two portions are combined at the outlet aperture 141.

The second heat exchange section 148 is immediately downstream from the first heat exchange section 146 relative to the working fluid flow direction, which is represented by the arrows in the flow path 138. The working fluid in the second heat exchange section 148 is in a parallel counter flow arrangement with the exhaust gas flow 145 through that same section. As shown in FIG. 10, only a portion 145A of the exhaust flow 145 passes through the second heat exchange section 148. The third heat exchange section 150 is immediately downstream (relative to the working fluid flow) from the second heat exchange section 148. The working fluid in the third heat exchange section 150 is in a parallel co-flow arrangement with the exhaust gas flow 145 through that same section. As shown in FIG. 10, only a portion 145B of the exhaust flow 145 passes through the third heat exchange section 150. The portion 145B bypasses the second heat exchange section 148 and, similarly, the portion 145A bypasses the third heat exchange section 150.

Although the illustrated plate 130 includes only a single working fluid flow path 138 on each side 132 and 134 of the plate 130, in other embodiments, the formed plate can include more than one working fluid flow path 138 on each side. For example, the formed plate may include two working fluid flow paths on each side arranged similarly to the flow paths 60 and 62 of the inserts 56 and 58 of FIG. 5.

While certain embodiments of the invention have been described with reference to the operation of a heat exchanger within a Rankine cycle waste heat recovery system, it should be recognized that the teachings of the present invention may as well be useful in other heat exchange systems that include the vaporization of a fluid. By way of example only, a refrigerant system might derive benefit from a heat exchanger similar to the ones described in the foregoing embodiments.

In a typical refrigerant system, a refrigerant (including but not limited to hydrocarbons, fluorocarbons, hydro-fluorocarbons, and the like) is vaporized in a heat exchanger at a relatively low temperature and pressure in order to extract heat energy from another fluid. The refrigerant is then condensed to a liquid state in another heat exchanger in order to reject the absorbed heat energy, either as waste heat or as useful heat.

A refrigerant system may be operated as an air conditioning system, wherein the heat energy is extracted from an air stream in order to cool and/or dehumidify the air stream for delivery to a conditioned space. Alternatively, a refrigerant system may be operated as a heat pump system wherein the heat energy is extracted from an unconditioned space and is rejected as useful heat to an air flow in order to heat a conditioned space. Alternatively, a refrigerant system may be operated as a chiller system wherein heat is extracted from a liquid coolant loop in order to provide a supply of low temperature coolant.

In some embodiments of the invention, the heat exchanger 20 and/or 131 might be useful within a refrigerant system in order to vaporize a refrigerant working fluid flowing through the plate assembly 34 or the formed plate 120. A flow of fluid such as air or coolant may be directed along the flow paths for the exhaust, in order to provide the heat of vaporization for the refrigerant working fluid.

Thus, the invention provides, among other things, a heat exchanger that includes a combination of counter flow and parallel flow circuiting of the working fluid to provide higher thermal effectiveness and a level of passive temperature control to minimize thermal stress in the heat exchanger and inhibit thermal breakdown of the working fluid and any lubricant. Various features and advantages of the invention are set forth in the following claims.

What is claimed is:

1. A method of vaporizing a fluid, comprising:
providing a heat sourcing fluid;
providing a working fluid to be vaporized using heat from the heat sourcing fluid;
separating the heat sourcing fluid into a first portion and a second portion;
transferring a first quantity of heat from the first portion of the heat sourcing fluid to the working fluid in a first heat exchange section;
directing the second portion of the heat sourcing fluid around the first heat exchange section to inhibit the transfer of heat energy to the working fluid in the first heat exchange section from the second portion of the heat sourcing fluid;
transferring a second quantity of heat from the second portion of the heat sourcing fluid to the working fluid in a second heat exchange section located upstream of the first heat exchange section with respect to the working fluid;
directing the first portion of the heat sourcing fluid around the second heat exchange section to inhibit the transfer of heat energy to the working fluid in the second heat exchange section from the first portion of the heat sourcing fluid;
transferring a third quantity of heat from the first portion of the heat sourcing fluid and the second portion of the heat sourcing fluid to the working fluid in a third heat exchange section located upstream of the second heat exchange section with respect to the working fluid; and recombining the first portion and the second portion of the heat sourcing fluid only after having transferred the first, second, and third quantities of heat from the heat sourcing fluid to the working fluid, wherein the step of transferring a third quantity of heat from the first portion of the heat sourcing fluid and the second portion of the heat sourcing fluid to the working fluid includes:

directing the working fluid through the third heat exchange section along a working fluid flow path;

transferring part of the third quantity of heat from the first portion of the heat sourcing fluid in a first plurality of sequentially arranged stages along the working fluid flow path; and transferring a remaining part of the third quantity of heat from the second portion of the heat sourcing fluid in a second plurality of sequentially arranged stages along the working fluid flow path, wherein the first plurality of sequentially arranged stages are alternating arranged with the second plurality of sequentially arranged stages.

2. The method of claim 1, wherein the first, second and third heat exchange sections are all located within a common heat exchanger.

3. The method of claim 1, wherein the step of transferring a first quantity of heat includes directing the working fluid in a counter-flow orientation to the first portion of the heat sourcing fluid.

4. The method of claim 1, wherein the step of transferring a second quantity of heat includes directing the working fluid in a co-flow orientation to the second portion of the heat sourcing fluid.

5. The method of claim 1, wherein the step of transferring a third quantity of heat includes directing the working fluid in an overall counter-flow orientation to the first and the second portions of the heat sourcing fluid.

6. The method of claim 5, wherein the overall counter-flow orientation includes at least two working fluid flow passes in cross-flow orientation with the first and the second portions of the heat sourcing fluid, successive ones of the at least two working fluid flow passes being located upstream of preceding ones of the at least two working fluid flow passes with respect to the heat sourcing fluid flow.

7. The method of claim 1, wherein the step of transferring a second quantity of heat includes at least partially vaporizing the working fluid.

8. The method of claim 1, wherein the step of transferring a first quantity of heat includes converting the working fluid to a superheated vapor state.

9. A method of vaporizing a fluid, comprising:
receiving a working fluid into an inlet of a heat exchanger, the heat exchanger extending in a longitudinal axis direction from a first end to a second end;
directing the working fluid into an inlet of a flow channel at the first end;
flowing the working fluid through a first segment of the flow channel extending in the longitudinal axis direction to the second end;
flowing the working fluid through a second segment of the flow channel extending in the longitudinal axis direction from the second end to an outlet of the heat exchanger arranged between the first and second ends, wherein the second segment of the flow channel is arranged downstream of the first segment;
flowing the working fluid through a third segment of the flow channel arranged between the inlet of the flow channel and the first segment, separating a heat sourcing fluid into a first portion and a second portion;
flowing the heat sourcing fluid through the heat exchanger from the second end to the first end; and
transferring heat from the heat sourcing fluid to the working fluid as the working fluid pass through the flow channel in order to vaporize the fluid, wherein heat is transferred to the working fluid in the first segment of the flow channel from the first portion of the heat sourcing fluid but not from the second portion, and wherein heat is transferred to the working fluid in the second segment of the flow channel from the second portion of the heat sourcing fluid but not from the first portion, and wherein heat is transferred to the working fluid in the third segment of the flow channel from both the first and the second portions of the heat sourcing fluid.

10. The method of claim 9, further comprising flowing the working fluid through a third segment of the flow channel arranged between the inlet of the flow channel and the first segment, the third segment including a plurality of sequentially arranged passes extending perpendicular to the longitudinal axis direction.

11. The method of claim 9, wherein the flow channel is one of a plurality of flow channels, each of the flow channels being separated by convolutions of a formed plate.

12. The method of claim 9, wherein the step of flowing the working fluid through a first segment of the flow channel includes heating the working fluid to a two-phase state.

13. A method of vaporizing a fluid, comprising:
receiving a working fluid into an inlet manifold of a heat exchanger;
distributing the working fluid from the inlet manifold to a plurality of plate assemblies arranged in the heat exchanger;
passing the working fluid in each of the plurality of plate assemblies through a tortuous flow path section;
receiving the working fluid from the tortuous flow path section of each of the plurality of plate assemblies into a plurality of hydraulically separated flow paths extending between the tortuous flow path section and an outlet manifold;
flowing the working fluid in each of the plurality of plate assemblies through the plurality of hydraulically separated flow paths while transferring heat to the working fluid from a heat sourcing fluid passing between adjacent ones of the plate assemblies;
recombining the flow of working fluid in the outlet manifold in a vaporized state; and
removing the working fluid from the outlet manifold of the heat exchanger;
wherein flowing the working fluid in each of the plurality of plate assemblies through the plurality of hydraulically separated flow paths comprises flowing a portion of the working fluid over bottom side surfaces of flow plates arranged within the plate assemblies and flowing another portion of the working fluid over top side surfaces of those flow plates.

14. The method of claim 13, wherein flowing the working fluid in each of the plurality of plate assemblies through the plurality of hydraulically separated flow paths comprises:
first flowing the working fluid in a plurality of flow passes in a cross-counter flow orientation relative to the flow direction of the heat sourcing fluid;
flowing the working fluid in a counter-flow orientation relative to the flow direction of the heat sourcing fluid; and last flowing the working fluid in a parallel flow orientation relative to the flow direction of the heat sourcing fluid.

15. The method of claim 14, wherein the working fluid is heated to a two-phase state after flowing in the counter-flow orientation and before flowing in the parallel flow orientation.

16. The method of claim 14, further comprising:
separating the heat sourcing fluid into a first portion and a second portion;
transferring heat from the first portion but not from the second portion to the working fluid as it flows in a counter-flow orientation relative to the flow direction of the heat sourcing fluid;
transferring heat from the second portion but not from the first portion to the working fluid as it flows in a parallel flow orientation relative to the flow direction of the heat sourcing fluid; and
recombining the first and second portions only after having completed the transfer of heat from the heat sourcing fluid to the working fluid.

\* \* \* \* \*